(12) United States Patent
Hsueh

(10) Patent No.: US 6,302,407 B1
(45) Date of Patent: Oct. 16, 2001

(54) CHUCK STRUCTURE WITH LOCKING AND POSITIONING FUNCTIONS

(76) Inventor: Chun Chu Hsueh, No. 129, Mei-feng, Xue-jia, Xue-jia Town Tainan Hsien (TW)

(*) Notice: Subject to any disclaimer, the term of this patent is extended or adjusted under 35 U.S.C. 154(b) by 0 days.

(21) Appl. No.: 09/553,047

(22) Filed: Apr. 20, 2000

(51) Int. Cl.$^7$ ................................................... B23B 31/12
(52) U.S. Cl. ........................... 279/62; 279/140; 279/902
(58) Field of Search .......................................... 279/60–65

(56) References Cited

U.S. PATENT DOCUMENTS

| | | | |
|---|---|---|---|
| 5,183,274 | * | 2/1993 | Sakamaki ................................ 279/62 |
| 5,435,578 | * | 7/1995 | Rohm ...................................... 279/62 |
| 5,499,829 | * | 3/1996 | Rohm ...................................... 279/62 |
| 5,816,582 | * | 10/1998 | Steadings et al. ...................... 279/62 |

* cited by examiner

Primary Examiner—Steven C. Bishop

(57) ABSTRACT

A chuck structure with locking and positioning functions includes a cylindrical body having head and tail ends, the middle thereof being provided with a plurality of inclined channels; a plurality of clamp pawls received in the channels; a limiting ring provided at the middle of the cylindrical body and having a plurality of equidistantly spaced apart through slots annularly provided at the center thereof for passage of the clamp pawls; a drive seat rotatably mounted at the head end of the body for enclosing and engaging the clamp pawls; and an outer shell for enclosing the drive seat. The outer shell includes upper and lower shell bodies. In use, the user turns the upper shell body to cause the clamp pawls to retract inwardly to clamp a tool, with the outer shell and the limiting ring providing a positioning effect so that the clamp pawls will not slip due to vibration or excessive torque, and the tightening force can be maintained.

13 Claims, 7 Drawing Sheets

100
CHUCK STRUCTURE WITH LOCKING AND POSITIONING FUNCTIONS

BACKGROUND OF THE INVENTION (a) Field of the Invention

The present invention relates to a chuck structure adapted for use with an electrically or pneumatically operated drill having a power shaft, more particularly to a chuck structure adapted to be hand-tightened and having locking and positioning functions.

(b) Description of the Prior Art

A conventional drill bit clamping structure mainly includes a rotary shaft connected provided with a chuck body. The body is externally provided with a rotatable adjustment shell and a fixed shell. The body is internally and annularly provided with a plurality of slanting clamp pawls. The user may rotate the adjustment shell to match the turning of the threads to control the clamp pawls to obliquely advance or withdraw to thereby achieve the object of bit clamping or release.

However, in the above-mentioned structure, after locking, the adjustment shell is in a non-positioning state, which may lead to loosening of the clamp pawl and hence falling of the bit, so that the user may have to stop operation and re-lock the bit. This is not only inconvenient to the user, it may also cause danger to the user.

SUMMARY OF THE INVENTION

A primary object of the present invention is to provide a chuck structure having locking and positioning functions to eliminate the drawbacks associated with the prior art. According to this object of the present invention, an upper shell body is manually rotated to bring a drive seat to rotate therewith. The drive seat hence causes clamp pawls to obliquely advance or withdraw to achieve bit clamping or release. A limiting ring is provided with generate an engagement or disengagement effect with the upper shell body. It is only necessary to cause the upper shell body to displace downwardly after tightening of a bit in order to bring the upper shell body to engage with the limiting ring. By means of a groove of the upper shell body that engages a retaining ring of a lower shell body, the chuck as a whole can be locked to prevent slippage of the bit due to vibration or excessive torque and to maintain the clamping force of the clamp pawls.

Another object of the present invention is to provide a chuck structure with locking and positioning functions in which a body has a top end provided with a bearing assembly. The bearing assembly includes a bearing seat formed from a rubber material and internally provided with an elastic plate having a radial opening, which can elastically hold a bit to obviate holding of the bit by hand and to prevent slippage of the bit when the chuck is released.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
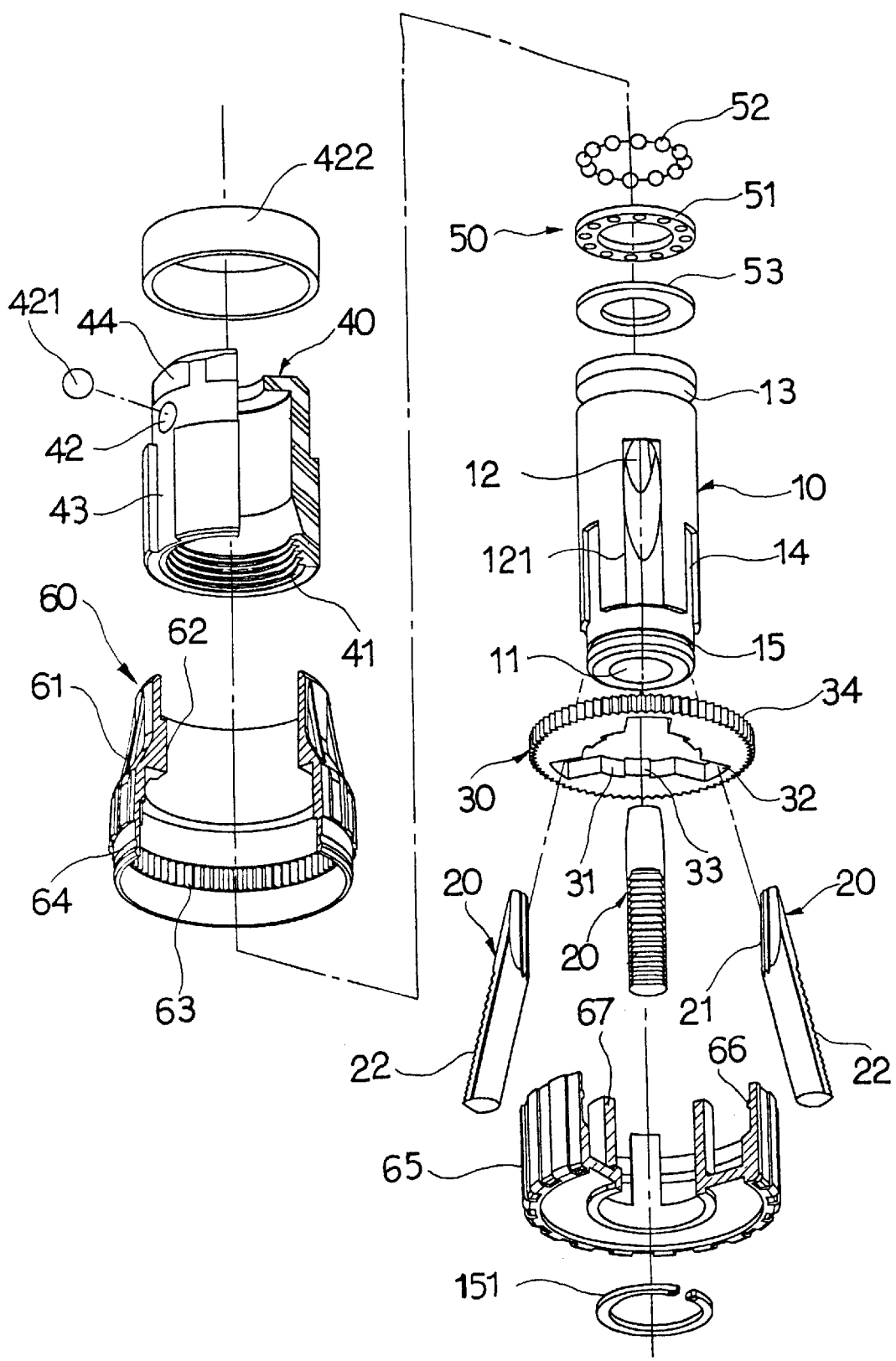
FIG. 1 is an exploded perspective view of a preferred embodiment of a chuck structure of the present invention.
Figure 2:
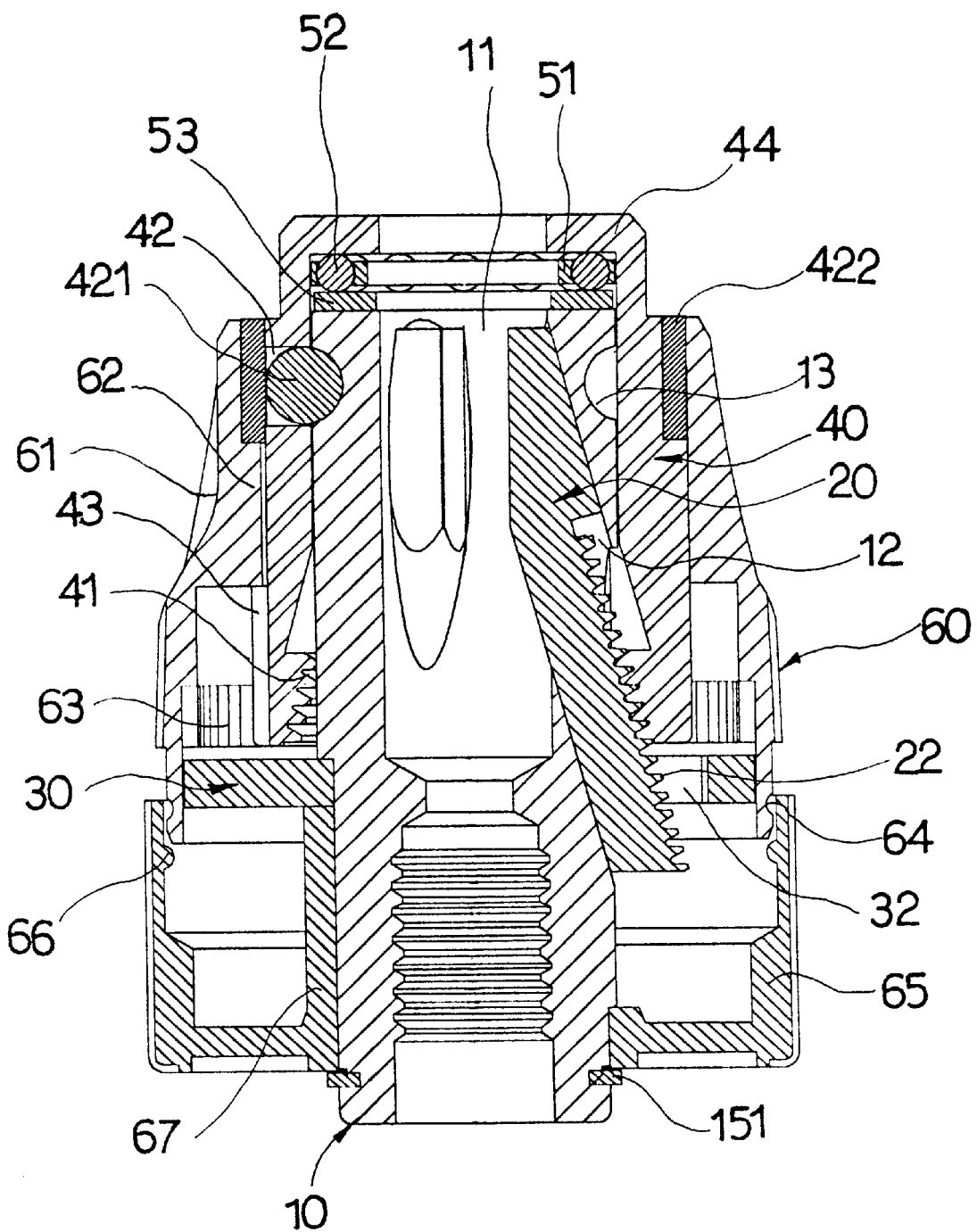
FIG. 2 is a sectional view of the preferred embodiment.

With reference to FIGS. 1 and 2, the present invention provides a chuck structure with locking and positioning functions. The chuck structure includes a body 10, a plurality of clamp pawls 20, a limiting ring 30, a drive seat 40, a bearing assembly 50, and an outer shell 60.

The body 10 is a cylindrical body having head and tail ends. The center of the body 10 is axially provided with an axial hole 11 for receiving a bit 70. The middle of the body 10 is provided with a plurality of inclined channels 12. The mouth of each channel 12 is provided with a shallow groove 121 to prevent generation of burrs during forming of the channels 12. The head end of the body 10 is provided with a curved groove 13. A plurality of axial grooves 10 are arranged annularly and spaced equally apart in the surface of the tail end of the body 10. The tail end is further provided with a C-shaped ring groove 15 for receiving a C-clip 151.

The clamp pawls 20 are received in the channels 12. Each clamp pawl 20 has a front end provided with a clamp face 21 and a rear end provided with a threaded face 22.

The limiting ring 30 is centrally provided with a central hole 31 for receiving the body 10. The edge of the central hole 30 is equidistantly provided with a plurality of through slots 32 for passage of the clamp pawls 20. The central hole 31 of the limiting ring 30 is internally provided with a plurality projecting groove blocks 33 spaced equally apart from one another for insertion into the axial grooves 14 of the body 10. The edge of the limiting ring 30 is provided with external teeth 34.

The drive seat 40 is rotatably sleeved on the head end of the body 10. The inner side of a bottom end thereof is provided with tapered threads 41 for enclosing and engaging the threaded face 22 of the clamp pawls 20 such that rotation of the drive seat 40 may synchronously bring each clamp pawl 20 to obliquely advance or withdraw. An upper portion of the drive seat 40 is provided with a positioning hole 42 for receiving a ball 421 such that the ball 421 projects from the curved groove 13. A ring 422 is fitted over the drive seat 40 at the positioning hole 42 to serve as a radial stop for the ball 421 and to enable the drive seat 40 to be slid over the body 10. The outer edge of the drive seat 40 is provided with a plurality of longitudinal grooves 43. A top end of the drive seat 40 is provided with a polygonal groove edge 44 to adapt to a wrench 80 so as to enhance the clamping force of the bit 70 or to allow easy disengagement.

The bearing assembly 50 is provided in the drive seat 40 and includes a bearing seat 51, a ball bearing 52, and a packing ring 53 for mounting slidably on the head end of the body 10.

The outer shell 60 encloses the drive seat 40 and includes upper and lower shell bodies 61, 65. The inner side of the upper shell body 61 is provided with a plurality of rails 62 projecting therefrom for insertion into the longitudinal grooves 43 of the drive seat 40 such that the upper shell body 61 can bring the drive seat 40 to rotate therewith. The inner side of a bottom end of the upper shell body 61 is provided with a plurality of toothed grooves 63 for engagement with the external teeth 34 of the limiting ring 30. The outer edge of the bottom end of the upper shell body 61 is provided with a groove 64. The inner side of the lower shell body 65 is provided with a retaining ring 66 projecting therefrom to work in conjunction with the groove 64 of the upper shell body 61 for positioning purposes. The center of the lower shell body 65 is annularly provided with a plurality of abutting posts 67 for abutting against the limiting ring 30 secured on the body 10. The lower shell body 65 is provided at the tail end of the body 10 and is secured by means of the C-clip 151 received in the C-shaped ring groove 15 so as to form an integral structure with the body 10.

Figure 3:
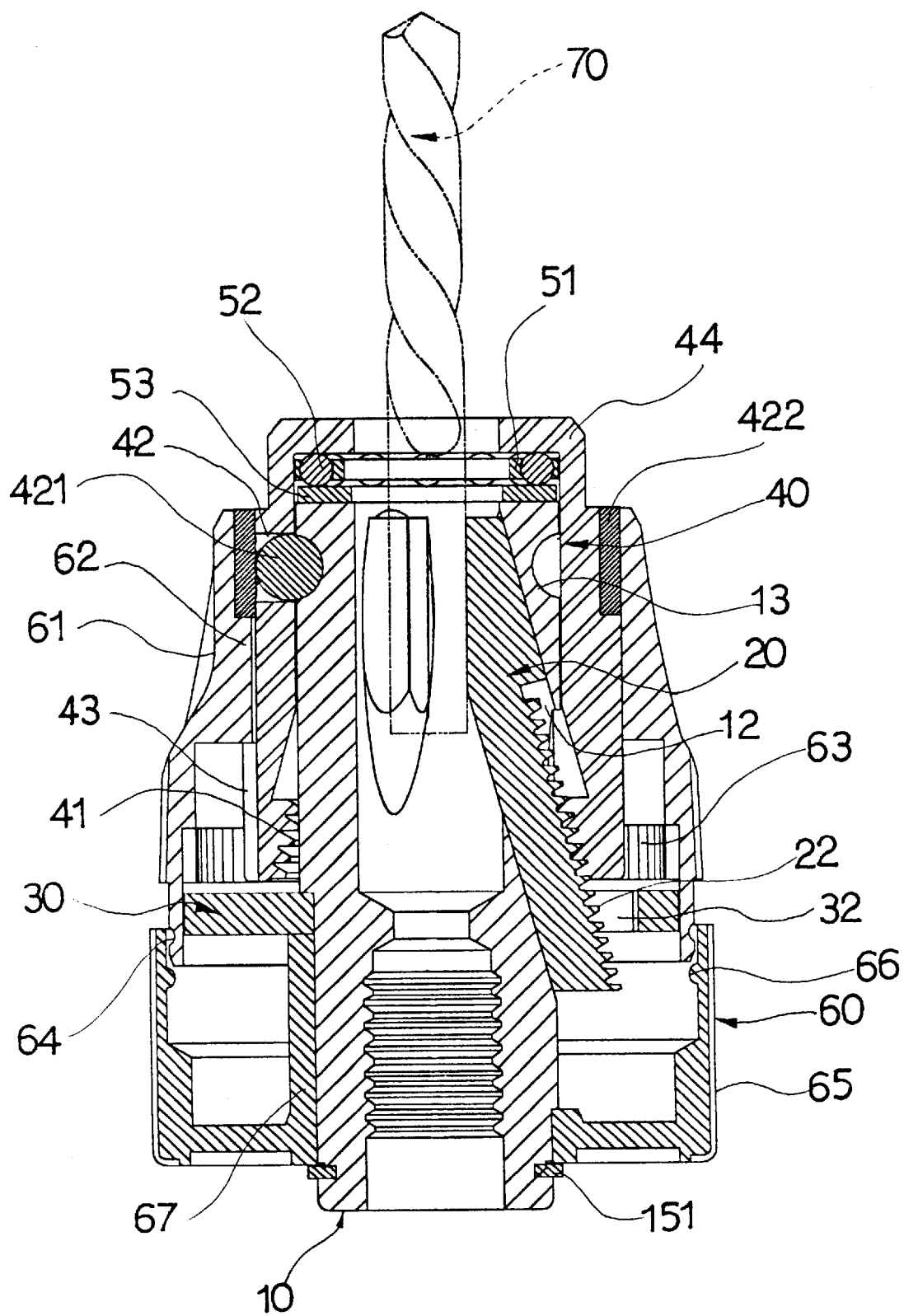
FIG. 3 is a sectional view of the chuck structure of the preferred embodiment holding a bit.
Figure 4:
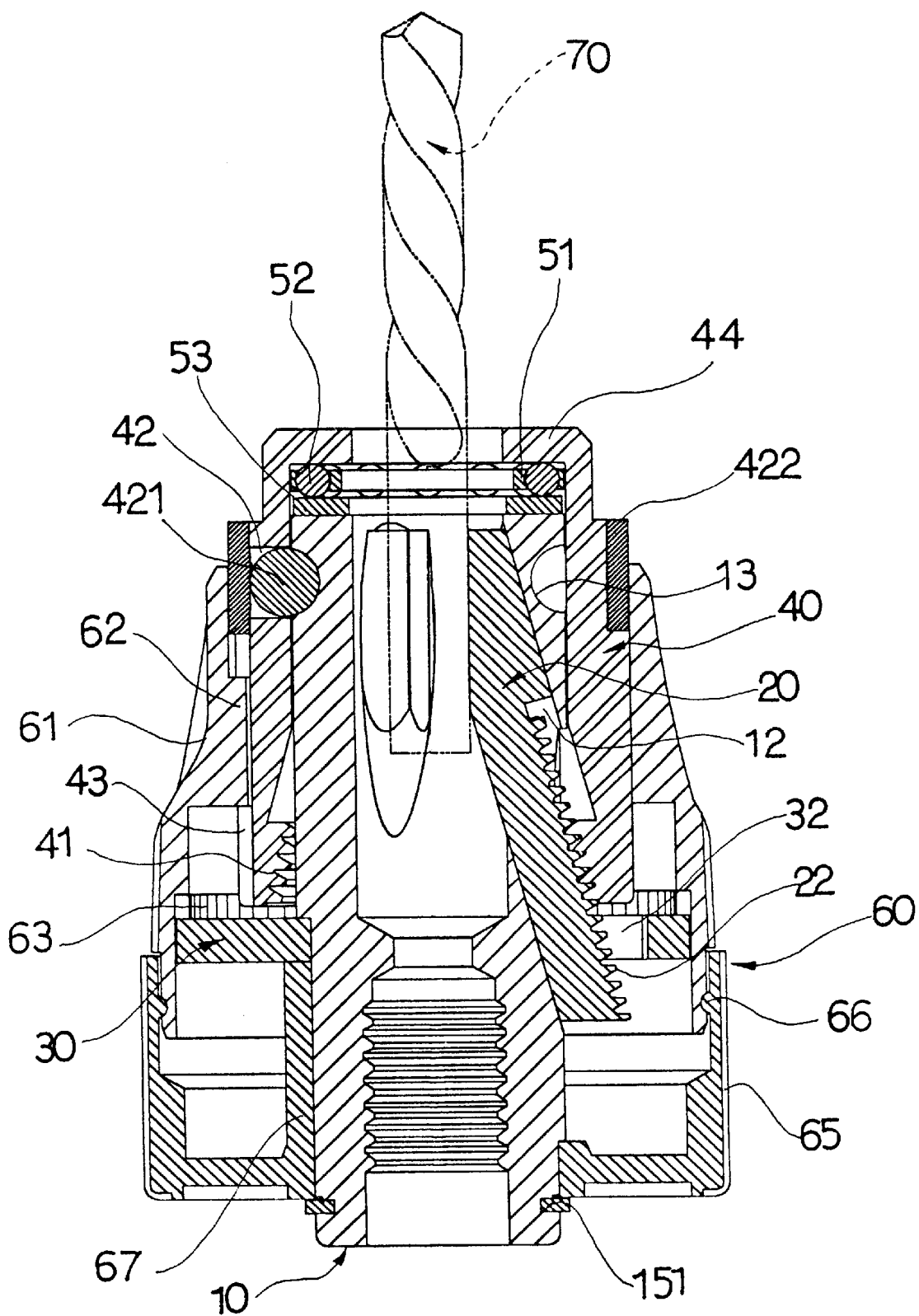
FIG. 4 is a sectional view of the chuck structure of the preferred embodiment after positioning of the bit.

The operation of the present invention will now be described as hereinafter:

With reference to FIG. 3, in use, the user puts the bit 70 into the axial hole 11 of the body 10 with both hands holding the upper and lower shell bodies 61, 65 for turning of the upper shell body 61. By means of the cooperation of the rails 62 and the longitudinal grooves 43, the drive seat 40 is brought to rotate synchronously therewith. At the same time, the threaded face 21 of the clamp pawls 20 are driven by the tapered threads 41 of the drive seat 40 to synchronously advance obliquely to force the clamp faces 21 of the clamp pawls 20 to clamp the bit 70 tightly to thereby achieve the object of bit clamping. After the bit 70 has been clamped tightly, the upper shell body 61 is pushed in the direction of the lower shell body 65 (as shown in FIG. 4) so that the groove 64 of the upper shell body 61 engages the retaining ring 66 and is secured thereby, driving synchronously the external threads 34 of the limiting ring 30 to engage the toothed grooves 63 of the upper shell body 61. Since the lower shell body 65 and the limiting ring 30 are secured on the body 10, the chuck structure can be secured as a whole to prevent loosening of the upper shell body 61 due to vibration or excessive torque and to maintain the tightening force of the clamp pawls 20.

When the user wishes to remove the bit 70, it is necessary to push the upper shell body 61 upwardly to disengage the groove 64 from the retaining ring 66 so that the toothed grooves 63 of the upper shell body 61 are separated from the external threads 34 of the limiting ring 30 to allow reverse turning of the upper shell body 61 and synchronously driving of the clamp pawls 20 to obliquely withdraw. Hence, the bit 70 can be released.

Figure 7:
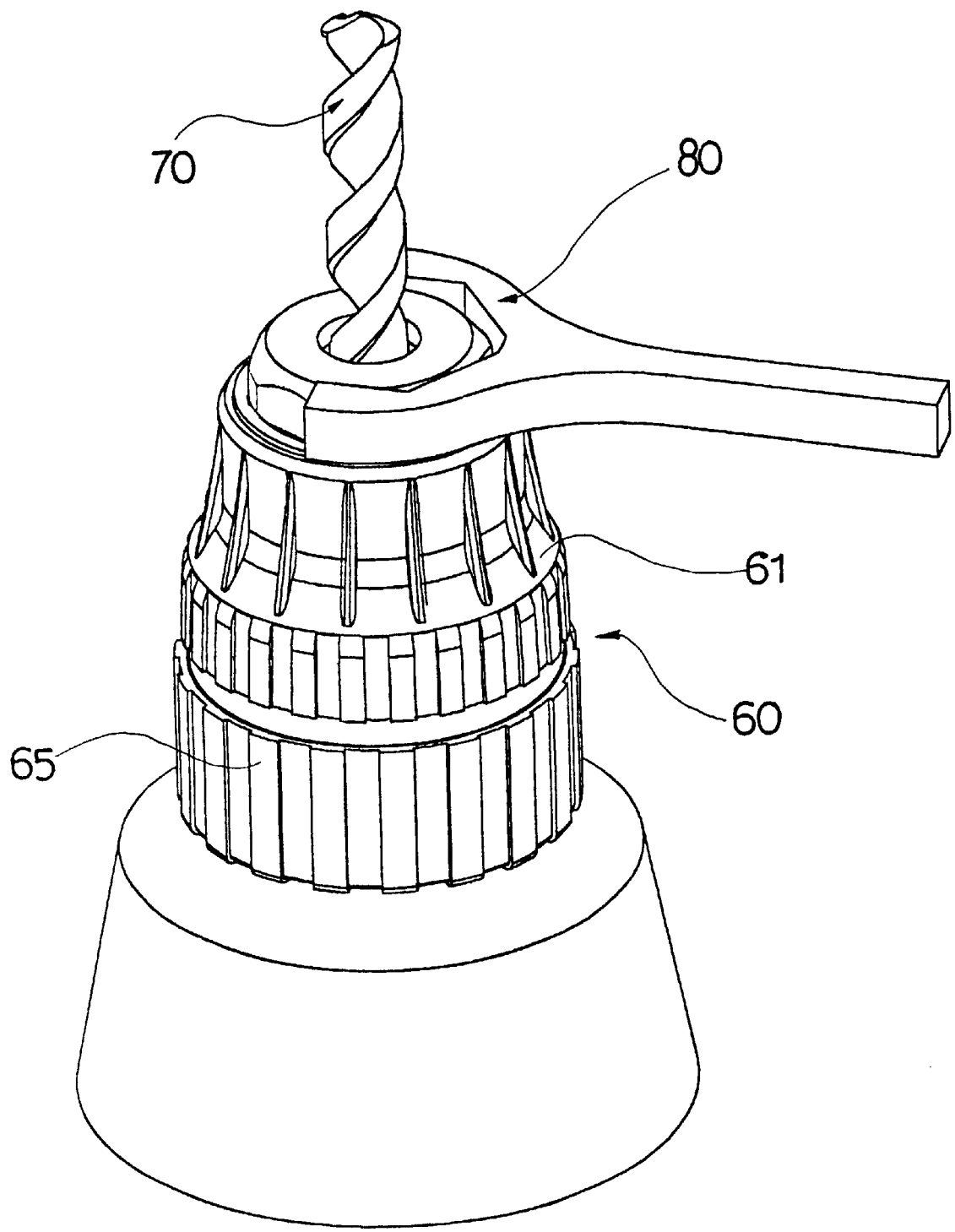
FIG. 7 is a schematic view illustrating use of the present invention in conjunction with a wrench.

With reference to FIG. 7, the wrench 80 can be fitted to the front end of the drive seat 40 with the polygonal edge 44 to lock the bit 70 with facile and with a tighter force. The arrangement of the polygonal edge 44 also facilitates removing of the bit 70 by turning the drive seat 40 in the reverse direction using the wrench 80.

Figure 5:
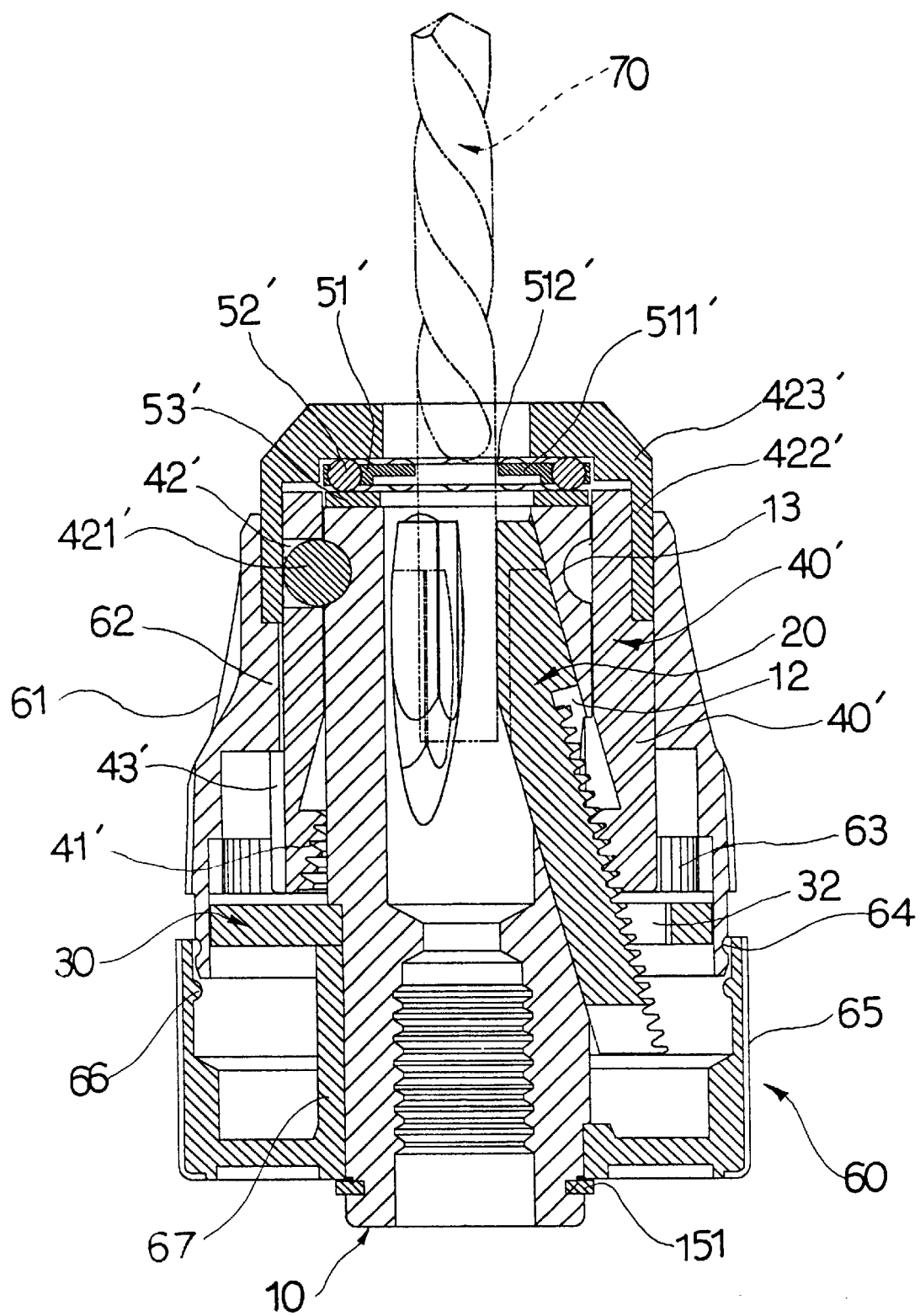
FIG. 5 is a sectional view of a second preferred embodiment of the present invention.
Figure 6:
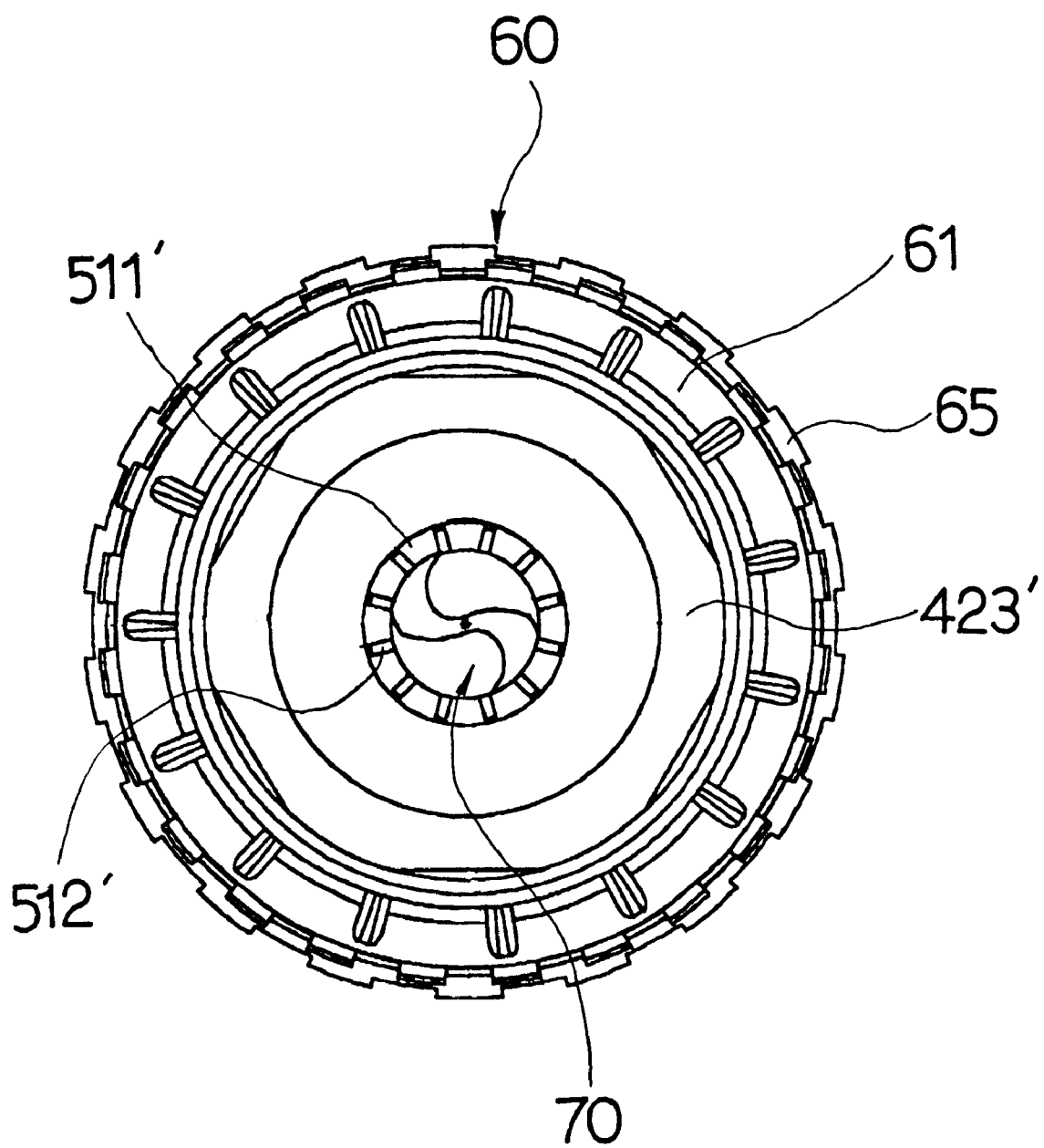
FIG. 6 is a top view of the second preferred embodiment.

With reference to FIGS. 5 and 6, which show a second preferred embodiment of the present invention, a drive seat 40' is rotatably provided at the head end of the body 10. The inner side of the bottom end thereof is provided with tapered threads 41' for enclosing and engaging the threaded face 22 of the clamp pawls 20. The outer edge of the drive seat 40 is provided with a plurality of longitudinal grooves 43'. The drive seat 40 may be configured to be further provided with an open top end with a ring 422' fitted to the drive seat 40 at the outside of a positioning hole 42' for limiting radial movement of a ball 421'. A top end of the ring 422' is provided with an angular bolt post 423 for use with the wrench 80 to enhance the clamping force of the bit 70 or to facilitate disengagement.

A bearing assembly 50' is provided in the drive seat 40' and includes a bearing seat 51', a ball bearing 52' and a packing ring 53 for mounting on the head end of the body 10. The bearing seat 51' may be formed from a rubber material and has an elastic plate 511' extending from the center thereof. The center of the elastic plate 511' is formed with a radial opening 512'. Since the elastic plate 511' in the bearing seat 51' is flexible, when the bit 70 is placed into the axial hole 11, elastic flexure will occur to change the size of the opening 512' so as to adapt to bits 70 of different sizes and to elastically hold the bit 70 in position. When the clamp pawls 20 tighten, the bit 70 can be maintain in the center of the axial hole 11 without the need to adjust the proper position of the bit 70. Besides, the bit 70 can be prevented from dropping to the ground.

In summary, the present invention utilizes the limiting ring 30 and the upper shell body 61, 61' to work in combination to allow easy engagement and disengagement. It is only necessary to push the retaining ring 66 into the groove 64 after tightening the bit 70 to achieve positioning. Hence, the chuck structure as a whole can be secured very quickly, and the bit 70 will not slip out when subjected to vibration or excessive torque to maintain the force of the clamp pawls 20. Furthermore, by means of the arrangement of the radial opening 512' of the elastic plate 511' to elastically hold the bit 70 in position, the bit 70 can be prevented from dropping after the chuck has been released.

Although the present invention has been illustrated and described with reference to the preferred embodiment thereof, it should be understood that it is in no way limited to the details of such embodiment but is capable of numerous modifications within the scope of the appended claims.

What is claimed is:

1. A chuck structure with locking and positioning functions, said chuck structure comprising:
   a cylindrical body having head and tail ends, a middle portion of said body being provided with a plurality of inclined channels;
   a plurality of clamp pawls mounted in said channels;
   a limiting ring provided at said middle portion of said body, said limiting ring being provided with a plurality of equidistantly spaced apart through slots in a center thereof for passage of said clamp pawls;
   a drive seat rotatably provided at said head end of said body to enclose and engage said clamp pawls;
   an outer shell for enclosing said drive seat, said outer shell including upper and lower shell bodies.

2. A chuck structure with locking and positioning functions as defined in claim 1, wherein said drive seat is internally provided with a bearing assembly which includes a bearing seat, a ball bearing and a packing ring for mounting on said head end of said body.

3. A chuck structure with locking and positioning functions as defined in claim 1, wherein said tail end of said body has a surface provided with a plurality of equidistantly spaced apart axial grooves.

4. A chuck structure with locking and positioning functions as defined in claim 1, wherein the center of said limiting ring is provided with a plurality of groove blocks projecting therefrom for engaging said axial grooves.

5. A chuck structure with locking and positioning functions as defined in claim 1, wherein said limiting ring is peripherally provided with external threads.

6. A chuck structure with locking and positioning functions as defined in claim 1, wherein said drive seat has an outer edge provided with a plurality of longitudinal grooves.

7. A chuck structure with locking and positioning functions as defined in claim 1, wherein said upper shell body has an inner side provided with a plurality of rails projecting therefrom for engaging said longitudinal grooves to achieve axial displacement.

8. A chuck structure with locking and positioning functions as defined in claim 1, wherein said upper shell body has a bottom end the inner side thereof being provided with toothed grooves for engagement or disengagement with said limiting ring.

9. A chuck structure with locking and positioning functions as defined in claim 1, wherein said bottom end of said upper shell body has an outer edge provided with a groove.

10. A chuck structure with locking and positioning functions as defined in claim 1, wherein said lower shell body has an inner side provided with a retaining ring projecting therefrom for engaging said groove of said upper shell body.

11. A chuck structure with locking and positioning functions as defined in claim 1, wherein said lower shell body has a center which is annularly provided with a plurality of abutting posts for abutting said limiting ring.

12. A chuck structure with locking and positioning functions as defined in claim 1, wherein said drive seat has a top end forming an open end, a ring having an angular bolt post is provided on said open end in tight fit for limiting radial displacement of a ball.

13. A chuck structure with locking and positioning functions as defined in claim 1, wherein said bearing seat is formed from a rubber material and is centrally provided with an elastic plate having a radial opening.

\* \* \* \* \*